United States Patent [19]

Jack

[11] 4,342,104

[45] Jul. 27, 1982

[54] HELIUM-SPEECH COMMUNICATION

[75] Inventor: Mervyn A. Jack, Penicuik, Scotland

[73] Assignee: University Court of the University of Edinburgh, Edinburgh, Scotland

[21] Appl. No.: 202,300

[22] Filed: Oct. 30, 1980

[30] Foreign Application Priority Data

Nov. 2, 1979 [GB] United Kingdom ................. 7937994

[51] Int. Cl.³ ............................................ H04B 11/00

[52] U.S. Cl. ................................ 367/132; 179/1 SH; 179/1 UW

[58] Field of Search ......... 367/132; 179/1 UW, 1 SH

[56] References Cited

U.S. PATENT DOCUMENTS

| | | | |
|---|---|---|---|
| 3,813,687 | 5/1974 | Geil | 367/132 X |
| 3,950,617 | 4/1976 | Dildy, Jr. | 179/1 SH |
| 3,965,298 | 6/1976 | Carlson | 179/1 SH |

FOREIGN PATENT DOCUMENTS

| | | | |
|---|---|---|---|
| 961978 | 1/1975 | Canada | 179/1 UW |

OTHER PUBLICATIONS

*Electronics Letters,* vol. 15, No. 18, Aug. 1979, pp. 548–550.

*Primary Examiner*—Richard A. Farley
*Attorney, Agent, or Firm*—John C. Dorfman

[57] ABSTRACT

The invention relates to a novel helium-speech unscrambler which can be located at a diver's location, and enables the helium-speech voiced by the diver to be subjected to waveform time expansion to reduce the bandwidth of the helium speech (e.g. to 2 to 3 KHZ) prior to transmitting the speech signals to a distant location on a carrier wave selected for optimum transmission through the water.

9 Claims, 4 Drawing Figures

HELIUM-SPEECH COMMUNICATION

TECHNICAL FIELD

This invention relates to a method of, and apparatus for, improving communications when life-supporting atmospheres other than air are in use.

When divers are required to operate at a great depth under water, the normal oxygen/nitrogen atmosphere encountered at the earth's surface is no longer acceptable as a life-supporting atmosphere. This arises because of the blood's increased absorptivity for nitrogen under the pressures encountered. It has thus become accepted practice for deep sea divers to use a nitrogen-free atmosphere (usually a helium/oxygen mixture). The fundamental pitch of a diver's speech signal is little affected by the changed life-support atmosphere, since it is set by muscular properties of the larynx, due to the different speed of sound in the gas mixture used as compared with air at NTP, the band width of the speech signals is dramatically altered, (typically increased by a factor of 2 to 3), thus rendering the speech unintelligible to an ear accustomed to speech encountered on the earth's surface. Throughout this specification the phrase "helium-speech" will be used to indicate the distorted speech resulting from breathing a nitrogen-free (or substantially nitrogen-free) atmosphere. The use of that phrase should not however be taken to mean that the invention is limited to applications where the atmosphere used contains helium.

Helium-speech typically has a bandwidth of 12 to 16 KHZ (compared to normal voiced signals in air at normal temperature and pressure (NTP) which have a bandwidth of 3 to 4 KHZ).

There have been many methods and apparatus proposed for rendering helium-speech intelligible.

BACKGROUND ART

Known helium-speech communication systems have involved transmitting the distorted speech signals (i.e. helium-speech as hereinbefore defined), via a cable, to the input of an electronic unscrambling device located at the water's surface. Prior art unscrambling devices employ digital memory means to perform a waveform time expansion in pitch synchronism with each pitch period of the speaker's voice signals and such devices have a power consumption of more than one Watt, a size in excess of 1000 cubic inches and a weight of some 17 lbs. It has thus been considered essential heretofore to locate the unscrambling device in a diving bell or at a surface station. Recently I have been involved in the development of an unscrambling device which is based upon analogue charge transfer device technology with associated complementary metal-oxide-silicon (CMOS) digital control logic which has allowed an unscrambling device to be developed which has a power consumption of 150 mW, a size of 10 cubic inches and a weight of ½ lb. The compact size and reduced power consumption of the new device offers operational advantages in allowing undersea use, permitting diver-borne operation of the unscrambling device.

DISCLOSURE OF THE INVENTION

According to one aspect of the invention there is provided a method of transmitting helium-speech which comprises subjecting an initial portion of each pitch period of the helium-speech to waveform time expansion, to reduce the bandwidth of the helium-speech, prior to transmitting the reduced bandwidth signals on a carrier wave to the listening station.

The bandwidth of helium-speech is a function of the gas pressure in the speaker's lungs and thus varies with the depth of a diver. The degree of waveform time expansion of the helium-speech signals can be adjusted by the diver (e.g. in response to advice received from the receiving station) but in a preferred arrangement a fixed expansion ratio can be used at the transmitter and the necessary compensating adjustments to optimise the intelligibility of the broadcast signals made empirically by the listener.

In the simplest embodiment of the method of the invention, the reduced bandwidth helium-speech transmitted on the carrier wave is fed to the ear of a listener at the listening station. Since the bandwidth is reduced between 2 to 3 times, the signal to noise ratio of the received signals can be much less than is the case where unmodified helium-speech signals are transmitted through an electrical cable.

In a preferred arrangement, the speaker's voice-receiving equipment includes a helium-speech unscrambling device and a transmitter for modulating a carrier wave with the modified bandwidth helium-speech signals, and this allows the production of a through-water communication system. To get acceptable range on a through-water communication system, the carrier wave cannot have a frequency of more than 8 KHZ, and it would not be possible to modulate such a carrier wave with a signal of bandwidth 12 to 16 KHZ. However, with the reduced bandwidth of the signals available with a speaker-adjacent unscrambling device it is possible to modulate a carrier wave, selected for optimum range in through-water transmission, and thereby to open a new possibility for direct through-water transmission of intelligible speech from a deep water diver.

The invention thus embraces a method of through-water communication of helium speech in which the bandwidth of a leading part of each pitch period of a diver's helium speech is reduced by waveform time expansion to provide a signal bandwidth acceptable for modulating a carrier wave of a frequency selected for optimum through-water transmission.

The optimum degree of waveform time expansion will be a function of the depth at which the diver is working and will thus vary from time to time. Rather than have the diver adjust this parameter in his transmitting equipment it is possible, according to a preferred feature of this invention, to use a preselected fixed degree of time expansion at the diver's unscrambling device and to provide the listener with a second unscrambling device of variable time expansion, whereby the listener can optimise the final speech signal for optimum intelligibility.

The invention also extends to apparatus for use in the method of the invention and in its broadest aspect covers transmitting equipment for a diver comprising a microphone, an analogue speech unscrambling device to subject a leading part of each pitch period of the diver's speech received from the microphone to waveform time expansion and thereby to reduce the bandwidth of the helium-speech signals, and means to transmit the reduced bandwidth signals to a listener location via a modulated carrier wave.

The invention also extends to a combination of the above through-water transmitting equipment with receiving equipment which includes a receiving transducer, a further analogue helium-speech unscrambling device of variable expansion ratio and a sound generator receiving output signals from the said further unscrambling device.

BRIEF DESCRIPTION OF DRAWINGS

The invention will now be further described, by way of example, with reference to the accompanying drawings, in which.

BEST MODE OF CARRYING OUT THE INVENTION

Figure 1A:
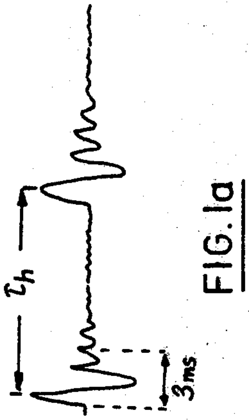
FIGS. 1*a* and 1*b* are graphs indicating the form of helium-speech voiced signals received by, and the output from, a helium-speech unscrambling device according to the invention.

FIG. 1*a* shows the basic form of a voiced helium speech waveform where the amplitude peaks correspond to the start of the pitch intervals. This pitch interval which is determined by muscular properties of the larynx, shows minimal change from normal air to high pressure helium/oxygen mixture.

Figure 1B:

The helium speech waveform suffers a shift in (vowel) formant frequencies and the rate of decay of the inter-pitch wavefrom is corresponding more rapid than for normal speech. The unscrambler technique to which this invention relates consists of storing the initial sections of each inter-pitch waveform which contain useful information and subsequently time-expanding this stored waveform to the general form expected in normal (air) speech, FIG. 1*b*. FIG. 1*b* shows that in the long term there is no time-base change (the pitch intervals on input and output remain equal) however, in the short term, between pitch peaks, the time-base is expanded. The discarded sections of the input waveform cause little degradation to the speech intelligibility.

The maximum duration of the stored segment is governed by the maximum expected pitch for the input helium speech. The design considered here stores a segment of duration 3 ms corresponding to a maximum voiced fundamental frequency of 300 Hz.

The degree of inter-pitch time-base expansion is governed by the specific helium/oxygen mixture being used by the speaker. However, the maximum required time-base expansion is of the order of 3:1. Thus, in order to eliminate loss of any section of input signal which contains meaningful information, four parallel storage channels are required such that one channel is always available to store the signal. More than one channel may be producing an output at any one time, a feature which is acceptable since in normal speech, the sounds produced during successive pitch intervals tend to superimpose.

Figure 3:
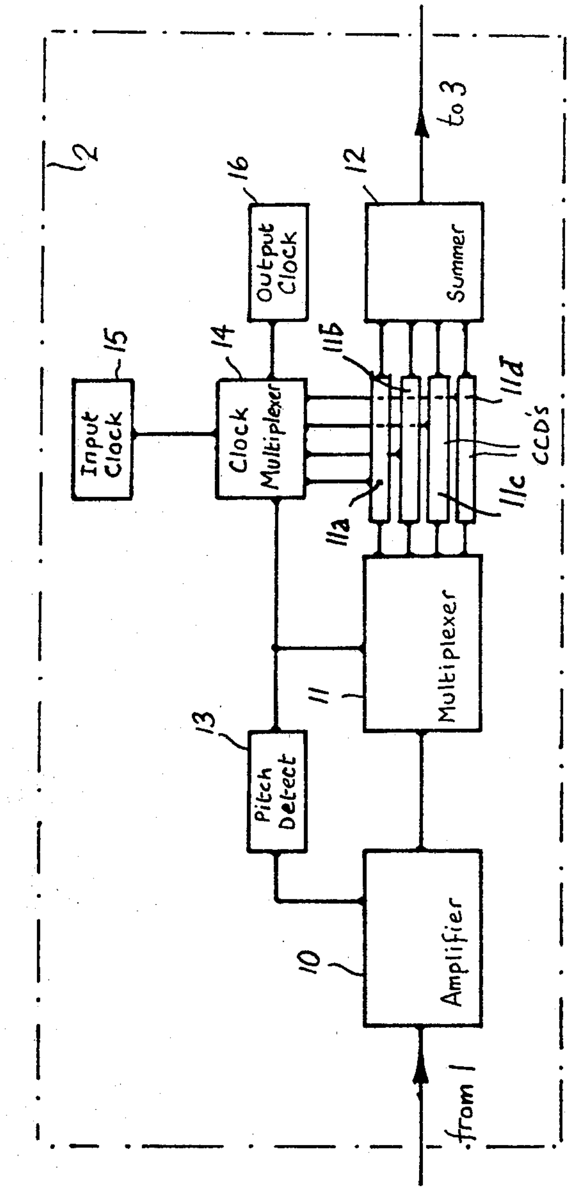
FIG. 3 is a block diagram of the unscrambler device shown in the transmitter section of FIG. 2.

FIG. 3 shows a schematic block diagram of the compact helium-speech unscrambling device to which this invention relates. The helium speech input is fed to a high-gain preamplifier 10 which incorporates high frequency pre-emphasis to compensate for the radiation losses produced at the mouth of a speaker in helium. The pre-amplifier also incorporates an AGC facility (e.g. 30 db). The pre-amplifier output is fed to a multiplexer 11 and enters four analogue delay lines 11*a* to 11*d* (Reticon SAD 512), each of which is capable of storing N=256 samples of the input waveform. As indicated previously, four storage channels are required to permit a maximum time-expansion of 3:1 without significant loss of information bearing signal.

The pre-amplifier output further appears at a pitch detector 13. In view of the reduced envelope decay times of the speech waveform in helium, a simple peak detector circuit can be successfully employed for pitch synchronisation. For unvoiced sounds, characterised by a noise-like waveform, the pitch detector operates continuously.

Figure 2:
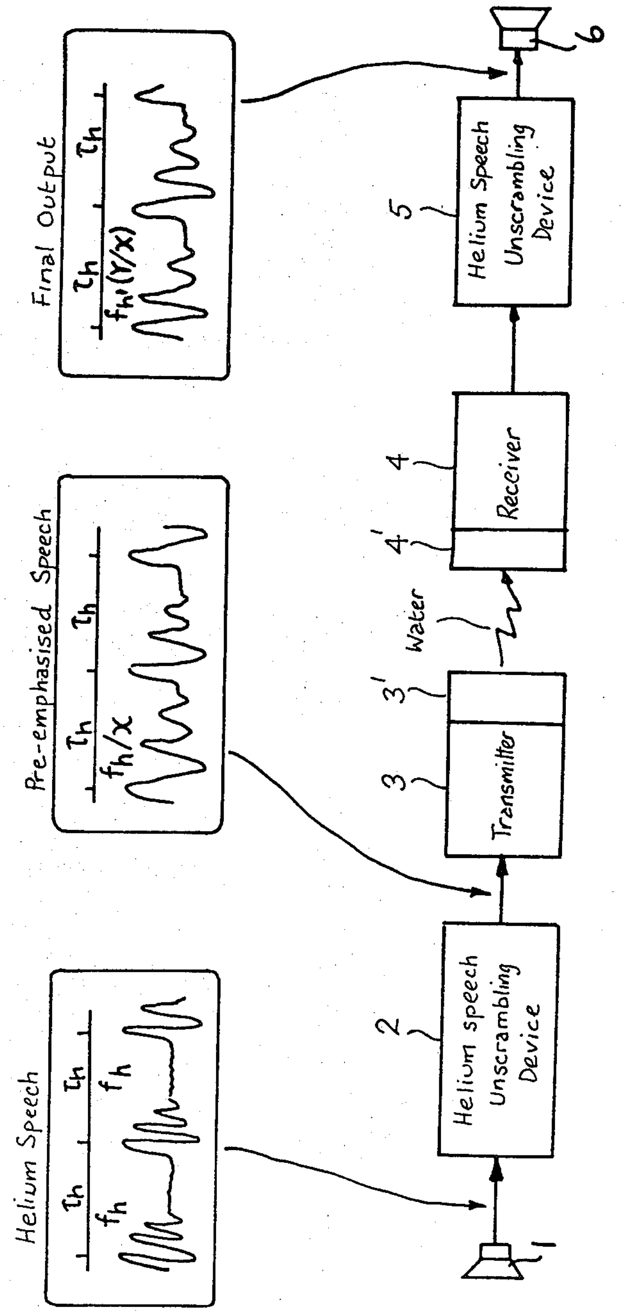
FIG. 2 is a block diagram of a communication system for helium speech.

The outputs of the CCD's 11*a* and 11*d* are fed to a summer 12 the output of which is that shown in FIG. 1*b* and can be fed direct to a transmitter 3 in the FIG. 2 embodiment.

The pitch detect signal from 13 is fed to a clock multiplexer 14 connected to an input clock 15 and an output clock 16.

The cycle of operation of the process is as follows. The output from the pitch detector 13 indicates the start of a pitch period. The input helium-speech 1 of bandwidth up to 16 KHZ—is read into one of the four channels at a clock rate of 85 KHZ (set by 15) for an interval of 3 milliseconds. At the end of this 3 ms period, the clock frequency for this channel is reduced by a factor which is set by the clock 16 and is dependent on the helium/oxygen mixture being used. The stored signal is thus read out at a lower rate, with an attendant bandwidth compression to the normal 3–4 KHZ speech bandwidth. On detection of the start of the subsequent pitch interval, the clock and signal multiplexers change over and the next channel reads in the helium speech.

The apparatus shown in FIG. 2 comprises a microphone 1, the analogue helium speech unscrambling device 2 (now of fixed expansion ratio $\chi$) and a through-water communications transmitter 3 which includes an output transducer 3'. These components are carried by the transmitting diver with an appropriate power supply (not shown). At the receiving location (e.g. on another diver, in a diving bell or at the surface of the water) there is provided a through-water communications receiver 4 (including a receiving transducer 4'), a further analogue helium speech unscrambling device 5 and the sound generator 6.

The equipment shown in FIG. 2 operates in the following way, the graphs in the Figure showing the signals at the indicated locations. The microphone 1 collects the helium speech having a bandwidth $f_h$ (typically of the order of 12 to 16 KHZ) and a pitch $\tau_h$ (the fundamental frequency of the speaking diver's speech). This signal is fed as input to the device 2 which reduces the bandwidth by a fixed, predetermined factor $\chi$, to give pre-emphasised speech signals with a bandwidth of $f_h/\chi$, retaining the pitch frequency at $\tau_h$. The value of $\chi$ is chosen to give an output bandwidth suitable for use with the selected carrier frequency used in the transmitter 3. Typically, $f_h/\chi$ would be in the range 2 to 3 KHZ. Following transmission of the modulated carrier wave through the water to the receiving location, it would be picked up by the transducer 4', demodulated in the receiver 4 and fed to the unscrambling device 5 which increases the bandwidth by a factor $\gamma$ to give a final output to the generator 6 which has the same pitch $\tau_h$ as the original speech but a bandwidth of $f_h\cdot(\gamma/\chi)$. Typically this bandwidth would be in the range 3 to 4 KHZ. By making the ratio $\gamma$ controllable by the listener, adjustment can be made to optimise intelligibility in the receiver's ear and compensate for the over-expansion effected at the transmitter for the purpose of accommodating the signal on a suitable carrier wave.

It will be appreciated that it is the ratio between the frequencies of the two clocks 15 and 16 which sets the expansion ratio and in the transmitter both clocks can be of preset frequency. In the receiver, the clock 16 can be of variable frequency to permit the listener to adjust the expansion ratio empirically.

To enable the device of FIG. 2 to be used in a full duplex through-water communication system, dual unscrambler devices are needed at each end of the link. Integrated circuit methods can be used for the construction of these dual devices.

The equipment shown in FIG. 3 could be used to send the pre-emphasised helium-speech signals directly into a line to the listening station, thus dispensing with the units 3, 3', 4' and 4 in the system shown in FIG. 2. This system has a significant advantage over the prior art line-connected system where broad band unmodified helium-speech signals are transmitted on the line since the 2 to 3 times smaller bandwidth of the output of the unscrambling device 2 will be received at the listening station with a better signal to noise ratio, and the listener can, as before, adjust the degree of expansion to optimize intelligibility.

I claim:

1. A method of through-water communication of helium speech in which the bandwidth of a leading part of each pitch period of a diver's helium speech is reduced by waveform time expansion to provide a signal bandwidth acceptable for modulating a carrier wave of a frequency selected for optimum through-water transmission, the carrier wave being modulated and fed directly into the water to a listening station, the degree of waveform time expansion effected at the diver's location being preset and the listening station including means to modify the time expansion of the received signal to optimise intelligibility of the received speech.

2. The method of claim 1 in which the bandwidth ($f_h$) of the helium-speech is reduced by a factor of $1/\chi$ in the unscrambling device at the diver's location and increased by a factor of $\gamma$ at the listener's location, $\gamma$ being not greater than $\chi$ and being adjustable by the listener.

3. The method of claim 2, in which the bandwidth of the signal modulating the carrier wave fed into the water is in the range 2 to 3 KHZ and the bandwidth of the signal fed to the listener is adjustable in the range 3 to 4 KHZ.

4. A method of through-water communication of helium-speech in which a leading part of each pitch period of a diver's helium-speech is subjected to a waveform time expansion to reduce the signal bandwidth to a level acceptable for use with a carrier frequency selected for optimum transmission through the water, a carrier wave at the said carrier frequency is modulated with the reduced bandwidth signal, the modulated carrier wave is fed via a first transducer into the water, the modulated carrier wave is received by a second transducer at a distant location, the output from the second transducer is demodulated, the demodulated output is operated on to reduce the waveform time expansion applied at the transmitter and the so operated-on signal is fed to a sound generator in the vicinity of a listener, said reduction in waveform time expansion being controlled by said listener.

5. A method as claimed in claim 1 or claim 4, in which the carrier frequency is not greater than 8 KHZ.

6. Apparatus for through-water transmission of helium-speech voiced by a diver comprising transmitting equipment for the diver comprising a microphone, an analogue speech unscrambling device to subject a leading part of each pitch period of the diver's speech received from the microphone to waveform time expansion and thereby to reduce the bandwidth of the helium-speech signals, and means to transmit the reduced bandwidth signals to a listener location, the transmitting means comprising a through-water communications transmitter to receive the reduced bandwidth signals and a transducer to feed the output from the transmitter directly into the water to the listener location, and at the listener location a receiving transducer, a further analogue helium-speech unscrambling device of variable expansion ratio, which is adjustable by a listener at said listener location, and a sound generator, for said listener, receiving output signals from the said further unscrambling device.

7. Apparatus as claimed in claim 6 in which the diver's speech unscrambling device is capable of effecting a fixed waveform time expansion in the range 2:1 to 3:1.

8. A method of transmitting a diver's helium-speech to a remote listening station which comprises subjecting an initial portion of each pitch period of the helium speech to waveform time expansion to reduce the bandwidth of the helium-speech and transmitting the reduced bandwidth signals to the listening station via an electrical line connecting the diver to the listening station, and adjusting the time expansion at the listening station to optimize intelligibility.

9. Apparatus for transmission of helium-speech voiced by a diver to a remote listener location comprising transmitting equipment for the diver comprising a microphone, an analogue speech unscrambling device to subject a leading part of each pitch period of the diver's speech received from the microphone to waveform time expansion and thereby to reduce the bandwidth of the helium-speech signals, and means to transmit the reduced bandwidth signals to a listener location, and at said listener location, a further analogue helium-speech unscrambling device of variable expansion ratio, means to vary said expansion ratio, and a sound generator receiving output signals from the said further unscrambling device.

* * * * *